United States Patent [19]
Kramer

[11] 3,869,391
[45] Mar. 4, 1975

[54] MAGNETIC DRAIN PLUG ASSEMBLY

[75] Inventor: William L. Kramer, Indianapolis, Ind.

[73] Assignee: General Motors Corporation, Detroit, Mich.

[22] Filed: Apr. 1, 1974

[21] Appl. No.: 456,685

[52] U.S. Cl................ 210/222, 251/144, 210/232, 137/351, 184/1.5, 184/6.25, 137/614.21
[51] Int. Cl............................................ F16k 37/00
[58] Field of Search................. 251/144, 191, 192; 137/614.21, 559, 351; 210/222, 232; 184/1.5, 6.25

[56] References Cited
UNITED STATES PATENTS

| | | | |
|---|---|---|---|
| 2,704,156 | 3/1955 | Botstiber | 210/222 |
| 2,983,385 | 5/1961 | Botstiber | 210/222 |
| 3,370,144 | 2/1968 | Arthur et al. | 210/222 |
| 3,753,442 | 8/1973 | Tauber | 210/222 X |
| R20,291 | 3/1937 | Bock | 184/6.25 X |

Primary Examiner—William R. Cline
Attorney, Agent, or Firm—J. C. Evans

[57] ABSTRACT

A drain plug assembly includes a first threaded valve coupled to a threaded plug that serves to threadably locate the valve in sealed engagement with an internally threaded drain to prevent leakage thereacross and wherein the plug is operative to unscrew the valve from its sealed position while being screwed into the drain to seal the drain. In the preferred or working embodiment the plug includes a magnet on one end thereof for detecting metal chips in the lubrication sump of an engine.

3 Claims, 4 Drawing Figures

PATENTED MAR 4 1975  3,869,391

MAGNETIC DRAIN PLUG ASSEMBLY

This invention relates to threaded plug assemblies and more particularly to threaded plug assemblies having means for sealing a drain when a portion of the plug assembly is removed from the drain for inspection.

U.S. Pat. No. 3,370,144 discloses a plug assembly for an internally threaded drain from a lubricant sump or the like. It includes a spring-biased valve that is operative when a magnetic chip detector or the like is removed from a drain bore to seal the drain.

While the arrangement shown in U.S. Pat. No. 3,370,144 is suitable for its intended purposes, it requires the provision of a spring carriage and spring element for positioning a drain closure valve closed when a magnetic detector plug is removed from the drain for inspection.

It is an object of the present invention to simplify the construction of magnetic drain plug assemblies of the type including means for sealing the drain port when the plug assembly is removed therefrom by the provision of a pair of externally threaded parts each having a seal gasket supported thereon and threadably positioned within a drain bore to selectively seal against flow thereacross and means coupling the two threaded parts together so that one of the parts can be removed from the drain for inspection while concurrently sealing the drain by the other of the plug parts.

Yet another object of the present invention is to improve drain seals by the provision of a two-part plug including a threaded valve part having first seal means thereon and a threaded combination plug and tool part having second seal means thereon and means for coupling the tool part to the valve part when the valve part is located in sealed engagement with the drain bore so as to unthread the valve part from its sealed relationship with the bore while threading the tool part into the drain to seal it and wherein the plug and tool part is threadably removable from the drain for inspection and operative upon removal from the drain to thread the valve part into sealed relationship with the drain.

Yet another object of the present invention is to provide a two-part threaded plug for an internally threaded drain bore with one of the parts being located on one side of the bore and the other of the parts being located on the other side of the bore and with each of the spaced apart plug parts including seal means thereon selectively located in sealed engagement with the drain to prevent flow therethrough; one of the parts serving as a tool to thread the other of the parts into a sealed position with the bore, the part that serves as a tool including means thereon for detecting a condition on one side of the drain and being removable from the drain for inspection while concurrently sealing the port by threadably positioning the other part into a sealed relationship with the drain bore.

Yet another object of the present invention is to provide a magnetic chip detector for a drain in a lubricant sump including a plug having a magnetic chip detector on one end thereof that is threadably positioned within the drain bore by means of an externally threaded flange spaced with respect to a chip detecting magnet and including means thereon coacting with a valve element threadably received within the bore and positioned by inward threading of the plug to locate the valve element out of engagement with the drain and including means for defining a flow path for lubricant flow across the chip detecting magnet; and wherein the magnetic detector plug is threadably removable from the drain and operative to thread the valve element interiorly of the drain in sealed engagement therewith to prevent flow therethrough when the plug is removed from the drain for inspection.

Further objects and advantages of the present invention will be apparent from the following description, reference being had to the accompanying drawings wherein a preferred embodiment of the present invention is clearly shown.

Figure 1:
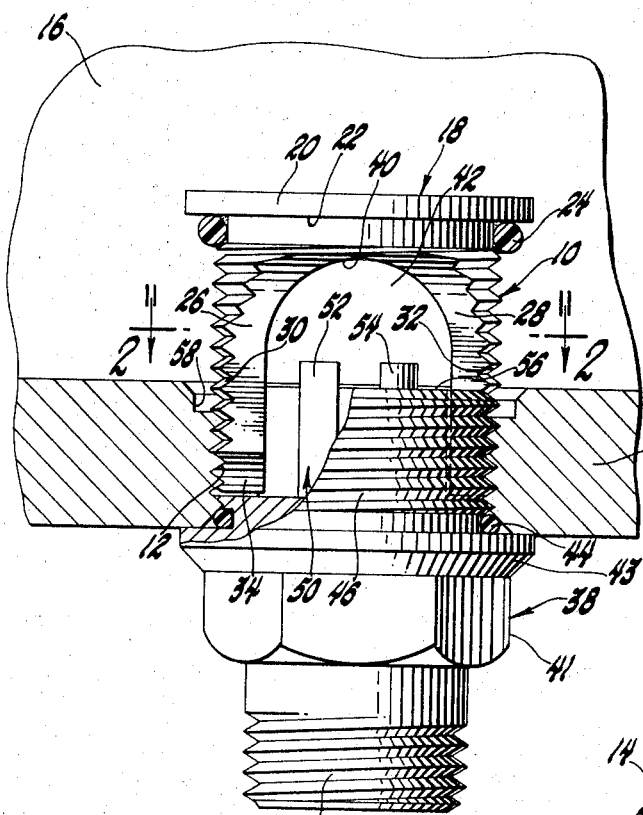
FIG. 1 is a fragmentary sectional view of a lubricant sump drain including the magnetic chip detector of the plug assembly of the present invention in an operative position.
Figure 2:
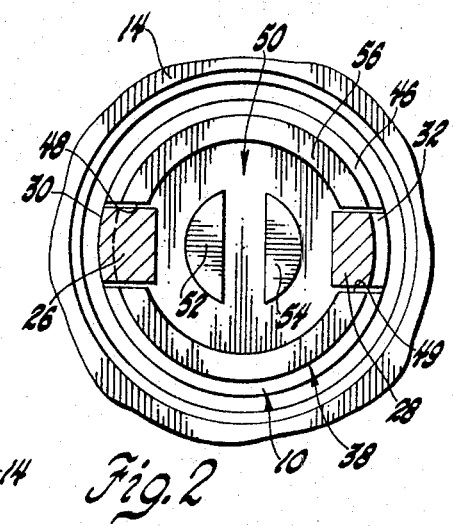
FIG. 2 is a horizontal sectional view taken along the line 2—2 of FIG. 1.

Referring now to the drawings, in FIG. 1 a magnetic drain plug assembly 10 is illustrated threadably received in an internally threaded drain bore 12 through a housing 14 which defines the lower part of an oil lubrication sump 16. The assembly 10 more particularly includes a valve 18 located interiorly of the sump 16. It includes a large diameter solid head 20 having a shoulder 22 on the underside thereof which supports an annular seal 24.

The valve 18 further includes a pair of depending legs 26, 28 having curved outer surfaces 30, 32 respectively that are externally threaded to be received within the threaded bore 12 for threadable movement with respect thereto. Each of the legs 26, 28 include tapered end surfaces 34, 36 thereon which serve as a guide to couple the valve 18 to an externally located plug 38. The legs 26, 28 are spaced apart from one another to define an entrance 40 from the sump 16 into a space 42 formed between the valve 18 and the plug 38.

Plug 38 includes a hexagonal head 41 located exteriorly of the bore 12. A radially outwardly directed shoulder 43 on the hexagonal head 41 has an annular seal 44 supportingly received thereon at a point immediately below the base of a threaded flange 46. The threaded flange 46 has a pair of diametrically located grooves 48, 49 therein which have a width equal to the width of the legs 26, 28 and serve as means for locating the plug 38 in coupled relationship with the valve 18. Once coupled, the threads on surfaces 30, 32 on valve 18 are continuous with the threads on flange 46 so as to define a continuous threaded plug adjustable within bore 12 between a valve open, plugged position in FIG. 1 and a valve closed, inspection position in FIG. 3.

The plug 38 further includes a magnet 50 having poles 52, 54 located centrally of the end of plug 38 in spaced relationship to the flange 46. The plug 38 further includes a threaded end 57 for coupling suitable leads to the magnet 50.

In devices of this type and other like devices that are threaded through an internally threaded bore to sense conditions within a housing, such as drain valves, pressure gauges or straight plugs, it is desirable to periodically remove an externally located part of the assembly for inspection without the escape of fluid from interiorly of the housing.

In the case of magnetic drain plugs, it is desirable to include means for sealing the threaded drain port when the magnetic chip detector plug is removed therefrom for inspection or replacement.

When the valve 18 and plug 38 are coupled together so as to locate the leg portions 26, 28 in the grooves 48, 49 the outer surface of the flange 46 and the surfaces 30, 32 define a continuous exteriorly threaded surface below an upper edge surface 56 on the flange 46. This continuous surface defines a dam between the sump 16 and the exterior of the bore 12 so that when the plug 38 is removed for inspection, a seal is maintained. More particularly, initially the annular seal 44 engages housing 12 when the assembly is in its valve open, plugged position as seen in FIG. 1. As the plug 38 is threaded outwardly of bore 12, the seal 44 is moved out of engagement with the housing 14 and the surface defined by flange 46 and legs 26, 28 below edge 56 prevents any substantial oil drainage from bore 12. The plug 38 serves as a tool for threading the legs 26, 28 of the valve 18 into the bore 12 until the seal 24 thereon is positioned in the valve closed, plug removed mode as shown in FIG. 3.

As positioned in FIG. 3, the valve 18 has the seal 24 thereon located against a counterbore surface 58 within the housing 14 and the opening 40 between the legs 26, 28 will be located below the surface 58 so that the solid head 20 of the valve will completely block oil drainage from the sump 16 through the bore 12.

Figure 3:
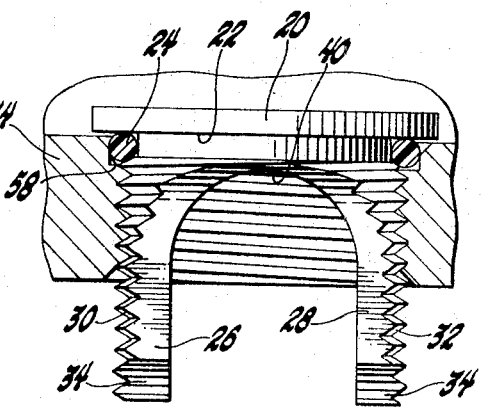
FIG. 3 is a fragmentary vertical sectional view showing a valve component of the assembly in FIG. 1 in a closed position.
Figure 4:
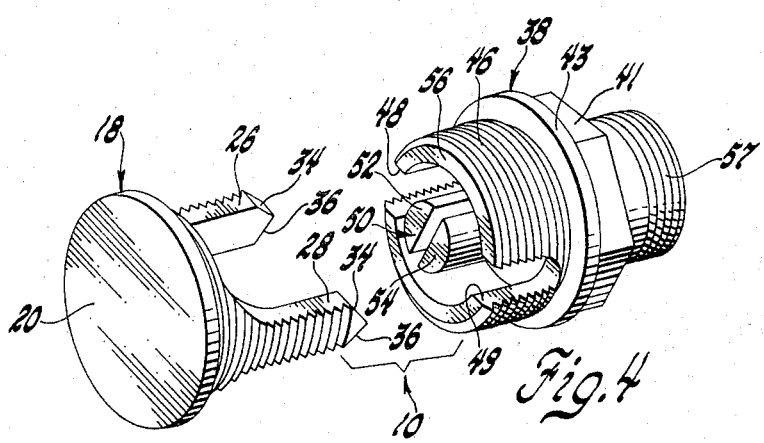
FIG. 4 is an exploded, perspective view of valve and plug components shown in FIG. 1.

When the valve 18 is positioned as shown in FIG. 3, the plug 38 will have the upper edge 56 of its threaded flange 46 located exteriorly of the internally threaded bore 12 so that the plug 38 can be separated from the valve 18 merely by its movement axially outwardly of the legs 26, 28.

Following inspection, the plug 38 can be quickly coupled to the valve 18 by location of grooves 48, 49 over the legs 26, 28 as they extend from the threaded bore 12 as shown in FIG. 3. The tapered end surfaces 34, 36 will guide the legs into the grooves 48, 49 and will define a continuous threaded surface below the edge 56 of the flange 46. Inward threaded movement of this surface will cause the plug 38 to act as a tool for threading the legs 26, 28 of the valve 18 outwardly of the threaded bore 12. The flange 46 of the plug 38 will concurrently be threaded into the bore 12 until the gasket 44 assumes its sealed relationship with respect to the housing 14 as shown in FIG. 1. At this point, the legs 26, 28 are threaded outwardly of the bore 12 but for a few threads on the end thereof that serve to interlock the valve 18 against separation from the bore 12. At the same time, the seal member 24 on the valve 18 is located out of sealing engagement with the housing 14 so that oil is free to flow from the sump 16 through the opening 40 defined by the legs into a space 42 between the valve 18 and the plug 38 so that metal chips in the oil will be readily deposited on the poles of the magnet 50 for indicating excessive wear of metal engine parts and further to separate chips from suspension in the lubricant and subsequent passage to operative components of the engine.

While the embodiments of the present invention, as herein disclosed, constitute a preferred form, it is to be understood that other forms might be adopted.

What is claimed is:

1. A magnetic drain plug assembly comprising: a valve having a large diameter solid head portion thereon adapted to be located interiorly of an oil sump including seal means thereon and two dependent leg portions, each of said leg portions having an outer surface with threads formed thereon adapted to be threadably received within an internally threaded oil sump housing bore, a plug having a magnet on one end thereof and an externally threaded flange in surrounding spaced relationship therewith, said flange having locator grooves formed therein, seal means on said plug below said externally threaded flange, said valve and said plug being coupled by insertion of the legs on said valve within said locator grooves when said valve is threadably located within the housing bore so as to locate the seal means thereon in sealing engagement with the housing to prevent oil drainage from the sump, said coupled plug and valve being threadable inwardly of a bore to position said magnet within the sump and to locate the seal means on said plug in sealing engagement with the housing to prevent drainage from the sump when the seal means on said valve is located in spaced relationship to the housing to maintain free communication between the sump and the magnet on said plug.

2. A combination valve and plug for controlling access through an internally threaded housing bore comprising: a plug having an externally threaded flange thereon, means forming an annular seal on said plug in surrounding relationship to said externally threaded flange for sealed engagement with the housing when the plug is threaded into the housing bore, a valve having a solid head located within the housing and including seal means thereon engageable with the housing to prevent oil drainage through the bore, a pair of dependent legs on said valve each having an outer surface with threads thereon for threadably connecting said valve within a housing bore to locate the valve in a closed position, said closed valve having said legs thereon located externally of the bore for coupled connection to said flange with said plug serving as a tool for screwing said valve from said bore into an open position with said seal means thereon out of engagement with said housing while threadably locating said plug within said bore to locate the annular seal thereon in sealed engagement with the housing to seal the bore when the valve is in its open position.

3. A combination valve and magnetic plug assembly for a threaded bore to a lubricant sump comprising: a plug having a magnet on one end thereof, a flange on said plug located circumferentially around said magnet, said flange including a pair of diametrically located grooves therein and further including an external thread therearound, a seal shoulder formed on said plug and including an annular seal member supported thereon, a valve for closing the bore when the plug is removed therefrom including a pair of spaced apart legs and a solid head portion including a seal shoulder thereon, an annular seal supported on said shoulder, each of said legs having an outer surface with an external thread coincident with the external thread on said plug flange, each of said legs further including a tip thereon for guiding said legs into said grooves to couple said plug and valve to one another, said plug serving as a tool to thread the valve into the bore so as to locate said seal thereon in a closed position for sealing said bore, said plug being removable from said legs when said valve is in its closed position for inspection of the magnet on the plug without drainage of oil from the sump, said plug being coupled to said valve by location of said legs within said grooves to cause threadable movement of the valve into an open position with its seal out of engagement with the bore and movement of the plug and seal thereon into a closed position to seal the bore with said legs defining a flow path for oil from the sump across the magnet on said plug when it is in its closed position.

* * * * *